Jan. 10, 1956  K. W. REYNOLDS ET AL  2,730,068
BULB WASHING AND REFLECTOR COATING APPARATUS
Filed March 14, 1952  6 Sheets-Sheet 3

Inventors:
Kenneth W. Reynolds,
John A. Billson,
by Vernet C. Kauffman
Their Attorney.

Jan. 10, 1956  K. W. REYNOLDS ET AL  2,730,068
BULB WASHING AND REFLECTOR COATING APPARATUS
Filed March 14, 1952  6 Sheets-Sheet 4

Inventors:
Kenneth W. Reynolds,
John A. Billson,
by *Vernet C. Kauffman*
Their Attorney.

Jan. 10, 1956   K. W. REYNOLDS ET AL   2,730,068
BULB WASHING AND REFLECTOR COATING APPARATUS
Filed March 14, 1952   6 Sheets-Sheet 5

Inventors:
Kenneth W. Reynolds,
John A. Billson,
by Vernet C. Kauffman
Their Attorney.

Jan. 10, 1956   K. W. REYNOLDS ET AL   2,730,068
BULB WASHING AND REFLECTOR COATING APPARATUS
Filed March 14, 1952   6 Sheets-Sheet 6

Inventors:
Kenneth W. Reynolds,
John A. Billson,
by Vernet C. Kauffman
Their Attorney.

United States Patent Office 2,730,068
Patented Jan. 10, 1956

2,730,068

BULB WASHING AND REFLECTOR COATING APPARATUS

Kenneth W. Reynolds, Mayfield Heights, and John A. Billson, Warrensville Heights, Ohio, assignors to General Electric Company, a corporation of New York Application March 14, 1952, Serial No. 276,494

7 Claims. (Cl. 118—49)

Our invention relates in general to an apparatus for applying metallic reflector coatings to the interior surface of glass lamp bulbs or similar hollow glass articles.

The method most generally employed at present for applying metallic reflector coatings to the interior surface of glass lamp bulbs is that commonly known as the thermal vaporization process wherein the metallic coating medium is vaporized within the bulb and condensed on the interior surface thereof while the bulb is in an evacuated condition. In order to obtain good adherence of metallic reflector coatings applied by such vaporization process it is necessary that the interior surface of the bulb be clean and free of all foreign matter. For this reason it has been customary to preliminarily clean the interior surface of the bulb by washing it with a suitable cleaning agent such as chemically pure water, for instance. However, in order to obtain reflector coatings of good quality free from discoloration and the like, and also to enable evacuation of the washed bulb to the required degree with the rapidity necessary for present day high-speed production manufacture, it is further necessary that the interior of the bulb be thoroughly dry and free from all moisture before it is subjected to the reflector vaporizing operation. For this reason the prior practice has been to allow the washed bulbs to thoroughly air-dry by storing them for protracted periods of time in suitable storage racks after which they were transported to the reflector vaporizing machine for application of the reflector coating thereto. Such prolonged air drying operation, however, has the disadvantage that the interior surfaces of the bulbs are apt to again collect and become contaminated with foreign matter which then results in the production of poorly adherent and therefore low quality reflector coatings, with consequent objectionably high production shrinkage or rejects. Because of the above-mentioned difficulties, and also because of the considerable attendant handling and transportation of the bulbs, the coating procedure heretofore in use has been inefficient and not entirely satisfactory.

It is an object of our invention therefore to provide apparatus for simplifying, consolidating and otherwise improving the manufacture of glass lamp bulbs provided with interior reflector coatings.

Another object of our invention is to provide apparatus for automatically processing glass lamp bulbs, as produced by conventional bulb blowing machinery, to provide them with internal metallic reflector coatings of high quality and good adherence, and at a high rate of speed.

Still another object of our invention is to provide a unitary automatic machine for thermally vaporizing metallic reflector coatings onto the interior surface of glass lamp bulbs or similar hollow glass articles and having in combination therewith apparatus for automatically prewashing and drying the interior of the articles and preheating them preparatory to the application of the reflector coatings thereto.

A further object of our invention is to provide a novel method of cleaning the interior surface of glass lamp bulbs or other hollow glass articles and thoroughly removing all moisture from the interior thereof.

A feature of the invention is the provision of a machine having two horizontally arranged side-by-side turrets operating in timed inter-relation, on one of which turrets the glass lamp bulbs or hollow glass articles are washed and dried and then preheated preparatory to the application of a reflector coating thereto and on the other of which the articles are evacuated and the internal reflector coating material then vaporized and condensed thereonto, together with transfer mechanism operating in timed relation with the two turrets for automatically transferring the articles from the first or article-cleaning turret to the second or coating-application turret.

Further objects and advantages of our invention will appear from the following detailed description of a species thereof and from the accompanying drawing.

In the general operation of the apparatus according to the invention, the glass lamp bulbs are loaded one by one in a neck-down position, by a combination loading and transfer device, into successive heads of an intermittently indexing prewashing turret which then carries the bulbs through a series of stations at which they are first interiorly washed by injection thereinto of a stream of a suitable cleaning solution such as deionized water, the excess water then removed from the interior of the bulb by injection of air jets thereinto, the bulbs then externally heated to vaporize the moisture remaining within the bulbs followed by removal of the vaporized moisture by injection of heated air jets into the bulbs, and the bulbs then intensively heated externally in an oven to a temperature in the neighborhood of 300° C. in preparation for the subsequent evacuation of the bulbs and application of the reflector coating thereto. The prewashed and preheated bulbs are then automatically transferred by the transfer device to successive heads of an intermittently indexing second or reflector-coating turret which then carries the bulbs through a series of stations at which they are progressively evacuated and then a reflector coating vaporized onto the interior surface thereof.

Referring to the drawing, the apparatus according to the invention comprises a pair of horizontally arranged side-by-side turrets or carrier members A, B rotatably mounted on vertical shafts 1 and 2, respectively, which are journalled in separate stationary table portions mounted on a bed or base member 3. The turrets A, B each support, at regularly spaced points around their peripheries, a plurality (16) of heads 4 and 5, respectively, each arranged to support a lamp bulb 6 in an upright position with its open neck end 7 down. The turrets A, B are intermittently indexed in counterclockwise directions and in synchronized relation to advance the heads 4, 5 thereof through the stations A1–A16 and B1–B16, respectively, at which the various operations are performed on the bulb. The indexing of the turrets may be performed by any conventional indexing mechanism, such as by means of rotating drum-type cams 8 and 9, respectively, mounted on separate horizontal cam shafts 10, 11 and each engaging with a plurality of rollers 13, 14 mounted around the peripheries of spiders 15, 16 fastened to respective turret support shafts 1, 2. Rotation of cam shaft 10 is imparted thereto by a main drive shaft 17 which is driven by an electric motor 18, fastened on the stationary table portion 49 of turret A, through a connecting belt drive 19. The shaft 17 carries a worm gear 20 which is meshed with a worm wheel 21 mounted on the cam shaft 10. The cam shaft 11 for turret B is rotated by a secondary drive shaft 22 which is driven from the main drive shaft 17 through a connecting chain drive 23 and which carries a worm gear 24 meshed with a worm wheel 25 mounted on the cam shaft 11.

Figure 5:
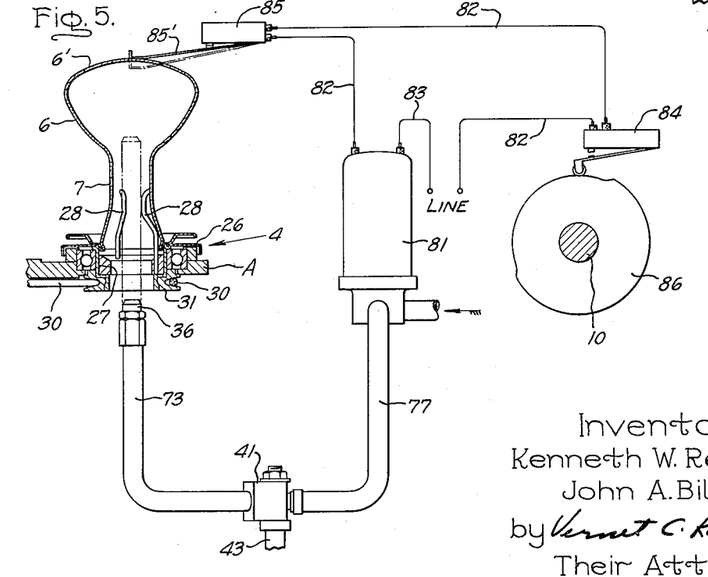
Fig. 5 is a fragmentary vertical section through one of the heads of the prewash turret at the bulb-washing station of the machine, and diagrammatically illustrating the mechanism for controlling the supply of cleaning liquid to the head at said station.
Figure 6:
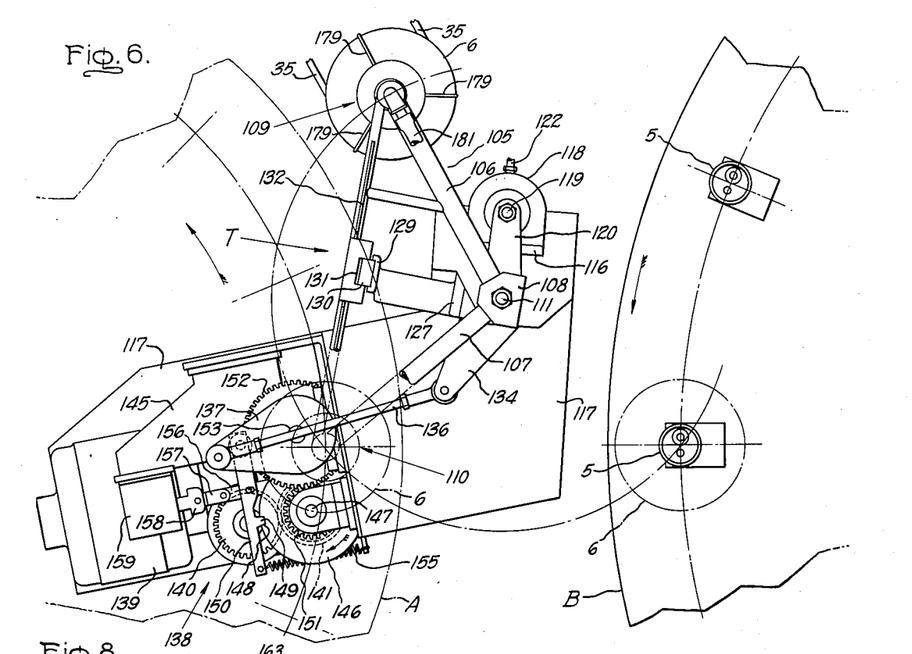
Fig. 6 is a plan view of the bulb-loading and transfer mechanism of the machine for loading the bulbs into the heads of the prewash turret and subsequently transferring them to the heads of the reflector applying turret.
Figure 7:
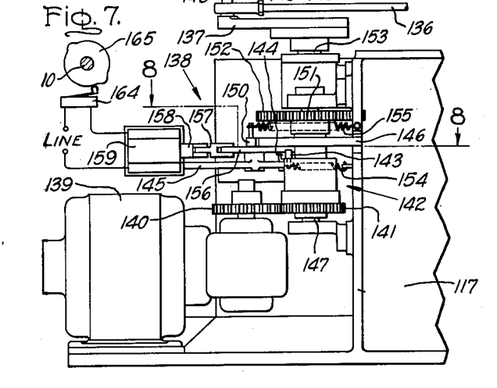
Fig. 7 is an elevation of the actuating and control means of the transfer mechanism for horizontally oscillating the bulb pickup holders thereof.
Figure 8:
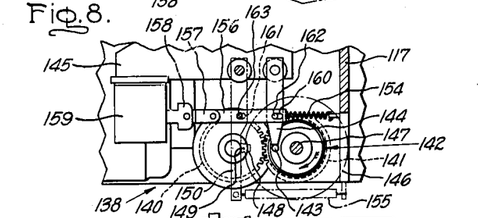
Fig. 8 is a horizontal section on the line 8-8 of Fig 7.
Figure 9:
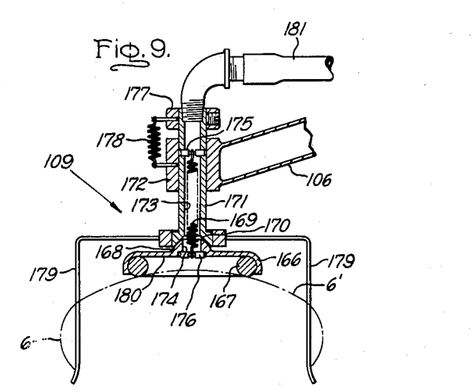
Fig. 9 is a vertical section through one of the bulb pickup holders of the transfer mechanism.

Each of the heads 4 of turret A comprises a rotatable bulb holder or chuck 26 (Fig. 5) mounted on the turret to rotate about a vertical axis and adapted to support the bulb 6 in an upright neck-down position on the upper side of the turret. The bulb holders 26 each comprise a collar member 27 extending through and journalled in the turret A to rotate about a vertical axis and provided with suitable means for engaging and supporting the bulb in upright position, the particular means shown comprising three or more upstanding spring fingers 28 over which the bulb neck 7 is placed, the fingers being contracted by and thus pressing outwardly against the inside wall of the bulb neck 7 to thereby hold the bulb in place in upright position. The bulb holders 26 are rotated at all the stations around the turret except the first or loading station A1, and the sixth and seventh stations A6 and A7, by means of a moving belt 30 which extends around the turret at the underside thereof and engages with pulleys 31 secured to the lower ends of the head collars 27, it being understood that the belt engages the pulleys only at those stations at which rotation of the head 7 is to occur. The belt 30 is looped around idler pulleys 32 and a driving pulley 33 which are rotatably mounted on the frame of the machine opposite the stations A6 and A7 at which the bulb holders are not rotated, and the driving pulley 33 is driven by the cam shaft 10 through suitable connecting drive means (not shown) which may be in the form, for example, of a combination gear and chain drive arrangement.

The bulbs 6 are successively loaded into the heads 4 of turret A at the loading station A1 either by hand or, as shown, by an automatic loading and transfer device T which picks up the bulbs one at a time from a supply line 34 thereof and places them in upright neck-down position in the bulb holders 26 of the turret heads 4. The supply line 34 of bulbs may be provided by a trackway 35 along which the line 34 of bulbs is manually advanced, after each pickup of a bulb therefrom by the loading device T, to thereby advance the foremost bulb into a position for subsequent pickup by the loading device on the next ensuing loading cycle thereof.

Figure 2:
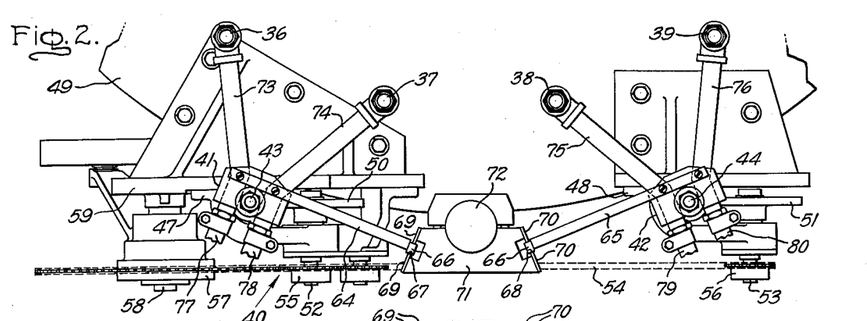
Fig. 2 is a fragmentary plan view of the mechanisms at the second and third positions of the bulb prewashing turret for respectively injecting a spray of cleaning liquid into the bulb and a jet of air into the bulb for the purpose of forcing out the greater portion of the cleaning liquid still clinging to the bulb wall.
Figure 3:
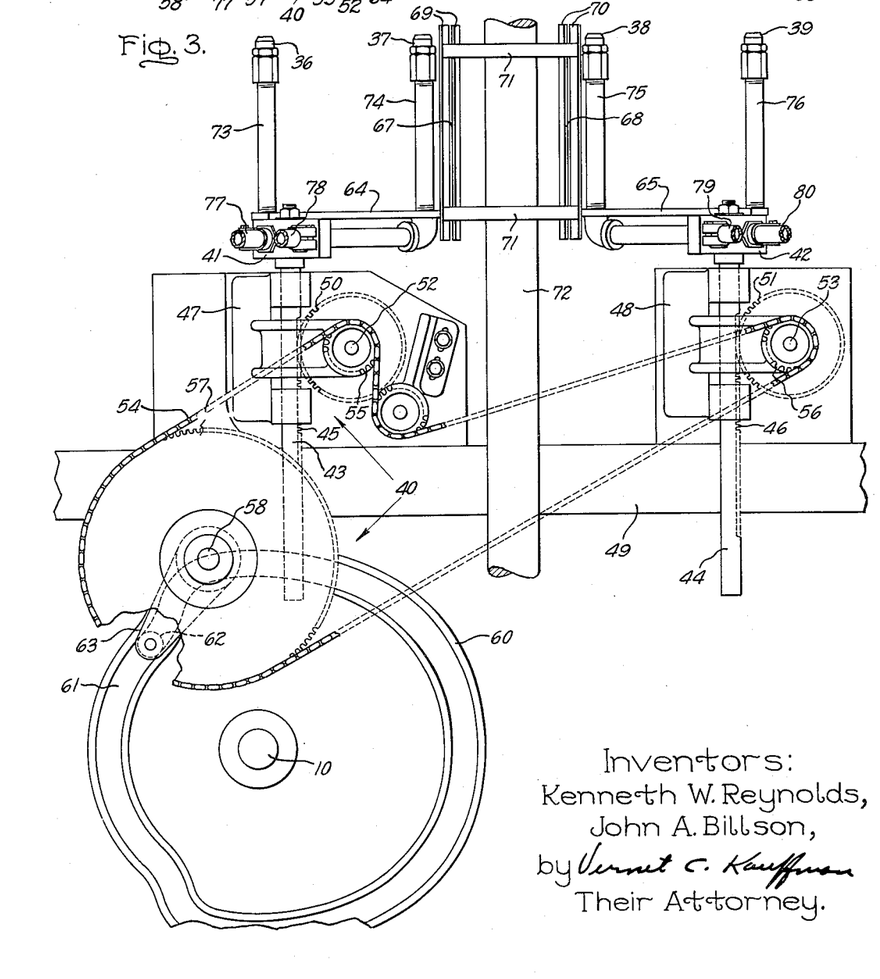
Fig. 3 is an elevation of the mechanism shown in Fig. 2.

After being loaded into one of the heads 4 of turret A at station A1, the bulb 6 is carried by the turret to the next station A2 where a spray of a suitable cleaning solution such as chemically pure (deionized) water, at a temperature of around 135° F. or so, is injected into the bulb from a spray nozzle 36 located therebeneath, and thence successively to the next three stations A3, A4 and A5 where the excess water remaining in the bulb and clinging to the wall thereof is allowed to drain therefrom and at the same time is forcibly expelled therefrom by high pressure air jets directed into the bulb at such stations by air nozzles 37, 38, and 39 located therebeneath. The nozzles 36, 37, 38 and 39 are all located beneath the turret A in positions in vertical alignment with respective turret heads 4 when indexed to and located at the stations A2 to A5, and they are raised and lowered in unison through the hollow bulb holders 26 and into and out of the bulbs 6 in the heads 4 during the dwell of the latter at the respective stations A2 to A5 by suitable elevating mechanism 40 (Figs. 2 and 3) actuated by the cam shaft 10. The particular elevating mechanism 40 shown comprises a pair of nozzle holder blocks 41, 42 in which the nozzles 36, 37 and 38, 39 are respectively supported, the said support blocks being provided with vertically depending slide support rods 43, 44, respectively, which are formed with gear rack portions 45, 46 and are slidably mounted for vertical reciprocation in support brackets 47 and 48, respectively, rigidly fastened to the stationary table portion 49 of the machine frame. The vertical movements of the support rods 43, 44 are imparted thereto by pinion drive gears 50, 51 which are meshed with the gear rack portions 45, 46 of the slide rods 43, 44 and are carried by shafts 52, 53, respectively, which are journalled in the brackets 47, 48. The drive gears 50, 51 are oscillated by a common drive chain 54 which engages with sprockets 55 and 56 mounted on the gear shafts 52 and 53, respectively, and also engages with a drive sprocket 57 fixed on a shaft 58 journalled in a depending extension 59 on support bracket 47. The drive sprocket 57 is oscillated by a face cam 60 mounted on the cam shaft 10 and provided with a cam groove 61 in which rides a cam follower roller 62 carried by a cam follower arm 63 integral with and extending from the drive sprocket 57.

During the vertical reciprocating movements of the nozzles 36 to 39 they are maintained in vertical alignment with the temporarily stationary heads 4, so as to pass freely through the openings in the bulb holder collars 27 and into and out of the bulbs 6 positioned thereon, by suitable guide means which, in the particular case illustrated, comprises separate guide arms 64 and 65 projecting horizontally from the respective nozzle support blocks 41, 42 and carrying guide rollers 66 at their outer ends for riding in guideways 67, 68 formed by pairs of vertically extending parallel guide plates 69, 69 and 70, 70, respectively, suitably secured to holder blocks 71 mounted on a post 72 fastened to the table portion 49 of the machine frame.

The nozzles 36 to 39 are connected by rigid piping or conduits 73, 74, 75 and 76, respectively, to one end of corresponding passageways in the support blocks 41, 42 and the said passageways in turn are connected at their other ends by flexible supply or hose lines 77, 78, 79 and 80 to suitable sources of supply of deionized water and air at suitable pressures, as the case may be. While the flow of air to the nozzles 37, 38 and 39 is preferably continuous during the operation of the machine, the flow of deionized water to the nozzle 36 is periodically interrupted during the indexing of the turret A. For such purpose, a conventional type electrically actuated solenoid controlled valve 81 (Fig. 5) is inserted in the water supply line 77. The energizing coil of the solenoid of valve 81 is electrically connected, by leads 82 and 83 and through a pair of series-connected switches 84, 85 in lead 82, to a suitable source of electric current supply. Being connected in series, closure of both switches 84, 85 is therefore necessary in order to operate the valve 81. Switch 84 is operated by a timing cam 86 on the cam shaft 10, while switch 85 is operated by the bulbs 6 as they index into and away from the wash station A2, the top 6' of the bulb engaging the control arm 85' of the switch 85 to close the latter. The switch control arm 85' thus acts, in effect, as a feeler device to detect the presence or absence of a bulb at the wash station A2 and permits operation of the water spray from nozzle 36 only if a bulb is actually present at such station. The switch 84 is closed by the timing cam 86 only after a head 4 arrives at the wash station A2 and opened before the head indexes away from the said station so as to operate the water spray from the nozzle 36 only during the interval when a head 4 is located at said station.

From station A5 the bulb 6 is carried by the turret A through two idle stations A6 and A7 at which natural drainage of any remaining water in the bulb may occur, and thence through two successive heating stations A8 and A9 where the bulb is externally heated by radiant gas burners 87, supported from the machine frame, for the purpose of vaporizing any moisture still remaining within the bulb. The heated bulb 6, with its vaporized moisture content, is then successively indexed by the turret A through the next four stations A10 to A13 where the vaporized moisture present in the bulb is forced out of the bulb by low pressure heated air jets directed thereinto from nozzles 88, while at the same time the external heating of the bulb by radiant gas burners 87 is continued. Like the nozzles 36 to 39 at the opposite side of the turret A, the nozzles 88 are connected in pairs, by rigid piping or conduits 89, to support blocks 90, 91 which are slidably mounted like the blocks 41, 42 for vertical reciprocation in support brackets (not shown) fastened to the machine table 49, and the support blocks 90, 91 are alternately raised and lowered in timed relation to the dwell of the turret, to introduce the nozzles 88 into the bulbs at the stations A10 to A13, by elevating mechanism (not shown) similar to, and having component parts the exact counterpart of those of the elevating mechanism 40 for the nozzles 36 to 39.

Figure 4:
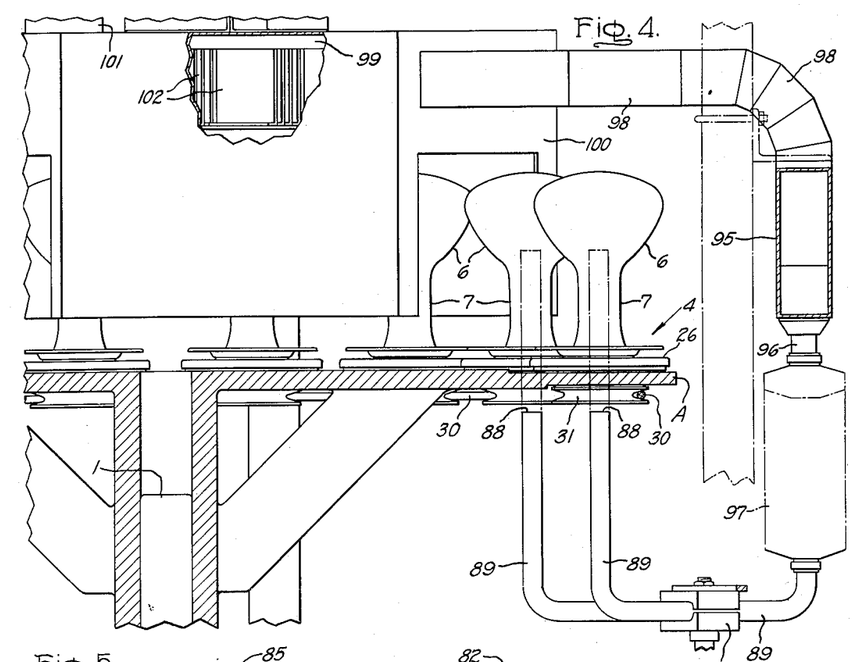
Fig. 4 is a fragmentary vertical section on the line 4-4 of Fig. 1.

During the operation of the machine the heated air is continuously supplied to the nozzles 88 from a hot air manifold 95 which is fixedly mounted on the machine frame and is connected to the nozzle support conduits 89 by separate supply conduits 96 (Fig. 4), the latter being connected to respective nozzle support conduits 89 by vertically arranged rubber bellows 97 which are interposed between the conduits 89 and 96 to allow for vertical movement of the supply conduits 89 connected to the vertically reciprocating nozzle support blocks 90 or 91. The manifold 95 is connected by a duct 98 to one end of a chamber 99 extending along the upper region of oven 100 where the air supply for the nozzles 88 is heated to the desired temperature. The other end of the air heating chamber 99 is connected by a duct 101 to a suitable source of compressed air, such as a conventional motor-driven blower unit (not shown), at a relatively low pressure of, for example, two pounds per square inch or thereabouts. The interior of the chamber 99 is provided with fins 102 to increase the heat-radiating surface over which the air must flow, thus facilitating heat transfer to the air flowing through the chamber.

Figure 1:
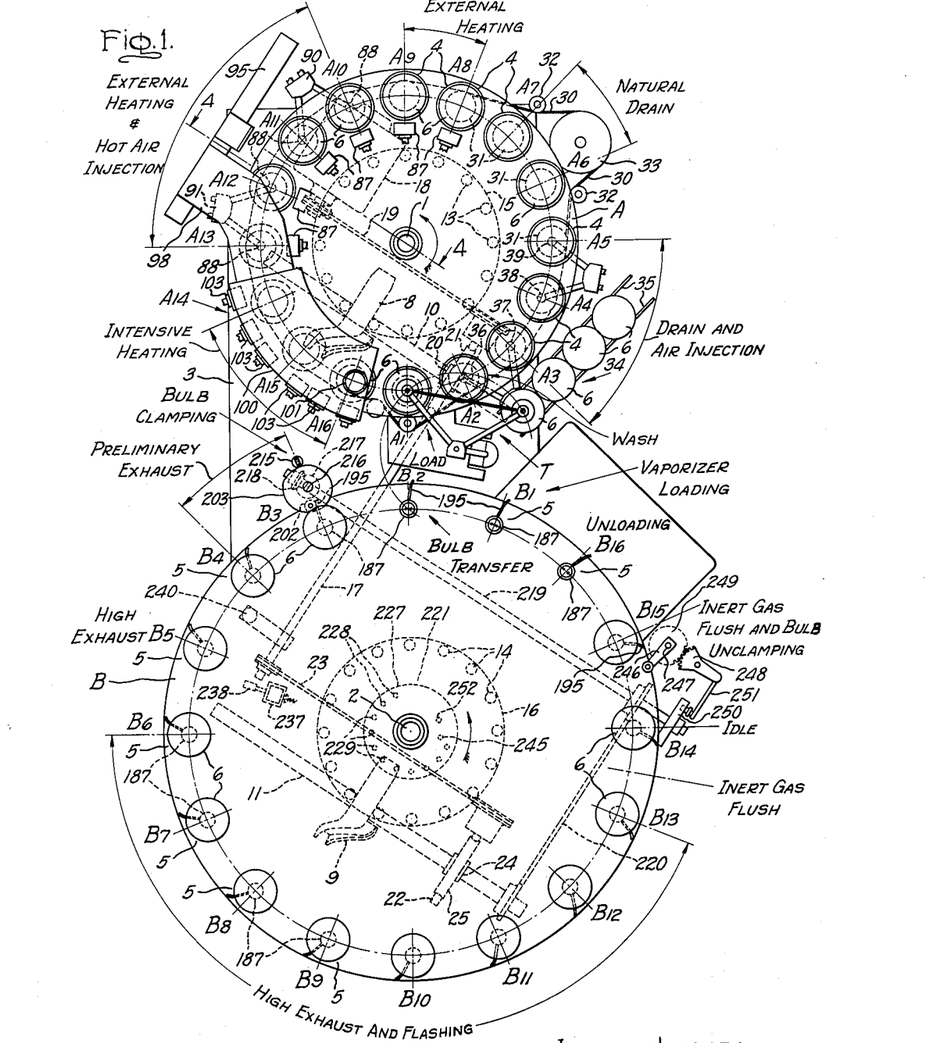
Fig. 1 is a diagrammatic plan view of a double turret type machine according to the invention for automatically prewashing and applying interior reflector coatings to glass lamp bulbs or similar hollow glass articles.

From the last one of the hot air blow-out stations A13 the bulb 6 is successively indexed through the final three stations A14 to A16 where it is intensively heated in oven 100 to a temperature of around 300° C. or slightly less, to prepare it for the subsequent evacuation and reflector coating operations which are performed on the bulb on turret B. The intensive heating of the bulb serves to promote and facilitate its rapid evacuation on turret B to the degree required for satisfactory operation of the reflector vaporizing process. As shown in Fig. 1, the bulb heating oven 100 extends around the upper side of the turret A from a point between stations A13 and A14 to a point between stations A16 and A1 so as to completely span stations A14 to A16 and thus continuously enclose the bulb 6 from the time just before it arrives at station A14 until just after it leaves station A16. The oven 100 is heated to the desired temperature in any suitable manner, such as by radiant gas burners 103 as shown.

Upon subsequent indexing of the bulb 6 from the final preheating station A16 to the unloading and reloading station A1, the combination loading and transfer device T then operates in timed relation to the synchronized dwell of the two turrets A and B to pick up the heated bulb 6 from the bulb holder 26 on turret A and then transfer and lower it into the head 5 on turret B. Referring more particularly to Figs. 6 to 10, the loading and transfer device T comprises a rotatable and vertically reciprocable spider or transfer arm member 105 mounted on the machine table 49 to rotate about a vertical axis and comprising a pair of arms 106, 107 extending radially outward from a hub 108 and carrying, at their outer ends, bulb pickup suction cups 109 and 110, respectively. The two suction cups 109, 110 are spaced apart a distance corresponding to the spacing between a head 4 on turret A and a head 5 on turret B when positioned, respectively, at the bulb loading-unloading station A1 on turret A and the bulb loading station B2 of turret B, and the center of rotation of the spider 105 is so located relative to the turrets A and B that when one of the cups (i. e., the transfer cup 110) is in vertical alignment with a head 5 at station B2 the other or bulb loading cup 109 will be in vertical alignment with a head 4 at station A1. This spacing between two of the heads 4 and 5 when located at stations A1 and B2 is also equal to that between a head 4 located at station A1 and the foremost bulb 6 in the supply line 34 of bulbs in trackway 36, so that when the bulb loading cup 109 is in vertical alignment with the foremost bulb 6 in the supply line 34 thereof the other or bulb transfer cup 110 is in vertical alignment with a head 4 at station A1.

The spider member 105 is fastened to the upper end of a vertical shaft 111 which is rotatable and vertically reciprocable in vertically spaced bearings 112, 113 on arms 114, 115, respectively, carried by a bracket 116 fastened to a support bracket 117 mounted on the machine table 49. The shaft 111 and its associated spider member 105 are vertically reciprocated by an air cylinder 118 mounted on the support bracket 116 and having a piston rod 119 which extends from each end of the cylinder and is rigidly connected at its upper and lower ends to the shaft 111 by tie arms 120, 121, respectively, which are fixed to the shaft longitudinally thereof but permit rotation of the shaft therein. The air cylinder 118 is connected at its opposite ends, by means of conduits 122, 123, to a suitable supply of compressed air (not shown), and the flow of air to the two ends of the cylinder 118 to effect the operation of the piston thereof is controlled, in timed relation to the dwell of the turrets A and B, by a conventional four-way double-action type solenoid-controlled valve 124 (Fig. 10) connected to the air supply conduits 122 and 123 and to the source of compressed air, the valve being arranged to introduce, when open, the compressed air into one end of the cylinder while venting the air from the other end thereof and, when closed, to reverse the operation and vent the air from the previously mentioned one end of the cylinder while introducing compressed air into the other end. The solenoid-controlled valve 124 is operated by a switch 125 which is electrically connected to the solenoid of the valve and to a suitable electric current supply, and the switch is closed by a timing cam 126 mounted on the cam shaft 10.

The spider member 105 is rotatably oscillated between its two limiting rotative positions (i. e., its bulb-pickup and its bulb-delivery positions) by a swivel bracket 127 mounted on the shaft 111, the bracket having a sleeve portion 128 through which the shaft 111 extends and is journalled so as to permit vertical reciprocation of the shaft relative to the bracket 127. The upwardly extending arm 129 of bracket 127 is provided at its upper free end with a vertically extending slide bar 130 which slides in a guideway 131 provided in a rigid tie or brace bar 132 connected across the outer ends of the transfer arms 106, 107. Rotative movement of the swivel bracket 127 is thus imparted to the spider member 105 through the slide connection 130, 131 therebetween which, at the same time, permits vertical movement of the spider member 105 relative to the swivel bracket 127. The swivel bracket 127 rests at its lower end on, and is keyed to, a flanged sleeve bushing 133 through which the shaft 111 extends, and the sleeve bushing 133 in turn rests on and is bushed in the bearing 113 on the bracket arm 115. The sleeve bushing 133 is provided with a radially extending operating lever 134 which is fastened to the flange 135 on the bushing and is pivotally connected at its outer end to one end of a connecting rod 136 the other end of which is pivotally connected to a crank arm 137.

The crank arm 137 is intermittently rotated or oscillated, in half-turn strokes, by driving mechanism 138 comprising a conventional type electric motor speed-reducer unit 139 mounted on the support bracket 117 and driving, through a pair of intermeshing gears 140 and 141, a conventional type single-turn clutch device 142 the engagement or disengagement of which is controlled by a clutch control pin 143 carried by the clutch device. The pin 143 is normally held in a clutch-disengaging position, in which it is restrained from rotative movement in an orbital path about the clutch-rotating axis, clockwise as viewed in Fig. 8, by a clutch-operating or release lever 144 pivoted on an arm portion 145 of the support bracket 117. When the pin 143 is released by pivotal movement of the lever 144 out of the orbital path of movement of the pin, the clutch 142 is engaged and rotatively drives a locking disc 146 mounted on the clutch shaft 147. The disc 146 is provided with a notch 148 in its periphery for receiving a tooth 149 on a locking lever 150 to thereby positively limit the rotation of the disc 146, by the engaged clutch 142, to a single revolution for each half turn or stroke of the crank arm 137. The rotative movement of the disc 146 is transmitted to the crank arm 137 through a gear 151 rotatively interlocked with the disc 146 and meshing with a gear 152 fastened on the crank arm shaft 153 which is rotatably mounted on the support bracket 117. The gears 151 and 152 have a 2-to-1 gear ratio so that rotation of gear 151 through one revolution rotates the gear 152, and therefore the crank arm 137, through a half revolution.

The clutch-release lever 144 is normally held in its clutch-disengaging position, wherein it restrains rotation of the clutch control pin 143 about the clutch shaft 147, by a tension coil spring 154 connected at its opposite ends to the lever 144 and to the support bracket 117. Likewise, the locking lever 150 is normally urged against the periphery of the locking disc 146, to cause the tooth 149 to snap into the disc notch 148 and lock the disc against rotation when the disc is rotated into a position with the notch opposite the tooth, by means of a tension coil spring 155 connected at its opposite ends to the locking lever 150 and to the support bracket 117. The two levers 144 and 150 are both pivoted out of their clutch-disengaging and disc-locking positions, respectively, to thereby cause the clutch 142 to drive the crank arm 137 through a half turn, by means of a common operating rod or bar 156 pivotally connected at one end by a link 157 to the plunger 158 of a solenoid 159 mounted on the bracket arm 145. The operating bar 156 is pivotally connected to the levers 144 and 150 by pin and slot connections, the bar having longitudinal slots 160 and 161 (Fig. 8) into which extends pins 162 and 163 on the levers 144 and 150, respectively. As shown, the slot 160 for the pin 162 on lever 144 is made longer than the other slot 161 so that on retraction of the operating rod 156 by the solenoid plunger 158 the locking lever 150 will be first disengaged from the locking disc 146 to release the latter for rotational movement an instant before the lever 144 is withdrawn out of the path of rotative movement of the clutch-release pin 143. The solenoid 159 is momentarily energized twice during each period of dwell of the turrets A and B, and in proper time relation to the vertical movements of the transfer arms 106, 107, to first rotate the transfer arms from their rotative bulb-pickup to their rotative bulb-delivery position and then return them to their said bulb-pickup position. The solenoid 159 is connected to a source of electric current supply through a control switch 164 (Fig. 7) which is operated by a timing cam 165 mounted on the cam shaft 10.

The suction cups 109, 110, which pick up and transfer the bulbs 6, each comprise a shallow inverted cup member 166 (Fig. 9) provided with an internal seating ring 167 of rubber or similar yieldable cushioning material for seating against the slightly convex upper end or top 6' of the bulb 6 to form a more or less airtight seal therewith. The cup member 166 is provided at its upper side with a centrally located frusto-spherical boss 168 which is yieldably held, by a tension coil spring 169, against a conical seat 170 provided in the lower enlarged end or head portion of a vertically extending tube or hollow stem 171 which is vertically reciprocable in a bushing 172 carried by the respective transfer arm 106 or 107. The spring 169 extends through the tubular passageway 173 in the tube 171 and through a communicating central passageway 174 in the cup member 166 and it is connected at its opposite ends to spring posts 175 and 176 on the tube 171 and cup member 166, respectively. The tube 171 is supported in place within the bushing 172 by a stop collar 177 which is fastened to the upper end of the tube and abuts against the upper end of the bushing. A tension coil spring 178, connected at its opposite ends to the collar 177 and to the bushing 172, acts to yieldable hold the collar 177 down against the bushing 172 so as to permit a limited amount of upward yielding movement of the suction cup member 166 when it is moved down against the bulb to grip it, thus avoiding the possibility of the cup member breaking the glass bulb. The lower end of the tube 171 is provided with three or more downwardly extending symmetrically arranged spring fingers 179, preferably made of spring wire, which yieldably grip against the sides of the bulb 6 for the purpose of not only centering the bulb relative to the suction cup 109 or 110 prior to contact therewith but also vertically aligning the bulb with the suction cup and assisting in the support of the bulb.

The interior downwardly facing hollow interiors 180 of the cup members 166 are intermittently connected to a suitable source of vacuum, in proper time relation to the operating movements of the transfer spider member 105, through the communicating passageways 173 and 174 in the tube 171 and cup member 166, respectively, and through flexible conduits 181, 182 fastened to the respective transfer arms 106, 107 and connected to the upper ends of the passageways 173 in the respective tubes 171. The conduits 181 and 182 are each connected, through solenoid-controlled valves 183 and 184, respectively (Fig. 10), to a common supply of vacuum, and the solenoids of the valves 183 and 184 are electrically connected to a suitable source of electric current supply through an operating switch 185 which is actuated by a timing cam 186 mounted on the machine cam shaft 10.

The operation of the transfer device T begins as soon as the turrets A and B have completed each index movement, at which time the transfer spider 105 is in its rotative bulb-pickup position wherein the suction cup 109 is vertically aligned with the foremost bulb 6 in the supply line 34 thereof, and the suction cup 110 is vertically aligned with a bulb 6 in that head 4 of turret A which is located at the loading-unloading station A1. During the ensuing dwell of the two turrets A and B the cam 126 first closes switch 125 to actuate the valve 124 so as to introduce compressed air into the upper end of the air cylinder 118. The piston rod 119 is thereby caused to move downwardly and in turn lower the transfer spider 105 to bring the suction cups 109, 110 into engagement with the tops of the bulbs 6 therebeneath. Simultaneously with, or just before, the engagement of the suction cups 109, 110 with the bulbs 6, the vacuum supply lines 181, 182 to the cups are opened by the closure of switch 185 by cam 186, the switch 185 thus actuating the solenoid valves 183, 184 which control the supply of vacuum to the suction cups. With the bulbs 6 then held by the suction in the cups 109, 110, the supply of compressed air to the air cylinder 118 is reversed by the cam 126, switch 125 and valve 124 so as to introduce compressed air into the lower end of the air cylinder 118, thus causing the piston rod 119 to raise the transfer spider 105 and lift the suction cups 109, 110 and the bulbs 6 carried thereby to the original elevated or transfer position of the spider. Thereupon, the solenoid 159, which controls the oscillating movements of the transfer device T, is momentarily energized by the closure of switch 164 by cam 165, causing the single-turn clutch-driving mechanism 138 to operate and rotate the transfer spider 105 to its rotative bulb-delivery position wherein the suction cups 109, 110 are respectively positioned over and vertically aligned with the heads 4 and 5 at stations A1 and B2. With the transfer spider 105 thus located in its bulb-delivery position, it is then lowered by the operation of the air cylinder 118 through cam 126, switch 125 and valve 124, to load the bulb 6 in suction cup 109 into the empty bulb holder 26 on that head 4 of turret A at station A1 and to simultaneously load the washed and preheated bulb 6 in suction cup 110 to that head 5 on turret B which is located at station B2, the vacuum supply to the suction cups 109, 110 being discontinued at the bottom of the downward movement of the spider 105, through opening of the valves 183, 184 by control switch 185 and cam 186, to thereby release the suction hold of the bulbs by the suction cups. With the bulbs 6 then positioned on the heads 4 and 5 of the respective turrets A and B, and no longer held in the cups 109, 110 by suction, the transfer spider 105 is raised and returned to its original elevated position by operation of the air cylinder 118 through actuation of the valve 124 by switch 125 and cam 126, and then rotated back to its original rotative starting or bulb-pickup position by actuation of the driving mechanism 138 by the solenoid 159, switch 164 and cam 165, thus completing the full cycle of operating movement of the combination bulb-loading and transfer mechanism T and positioning it in readiness for the next operating cycle thereof. After the transfer of the bulb 6 from turret A to turret B, and reloading of the empty head 4 at station A1 with an unprocessed bulb 6, the next index of the turrets A and B takes place whereupon the transfer mechanism T again starts its cycle of operation, it being understood that the transfer mechanism T moves through its full operating cycle once during each dwell of the turrets A and B.

Figure 11:
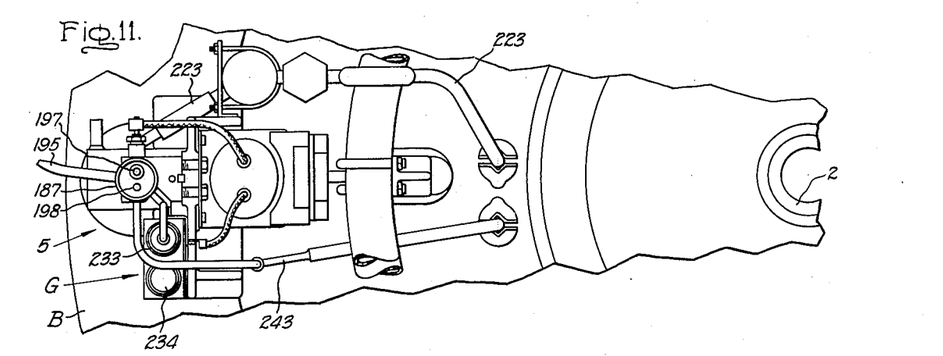
Fig. 11 is a fragmentary plan view of the reflector-applying turret of the machine, showing one of the heads thereon.
Figure 12:
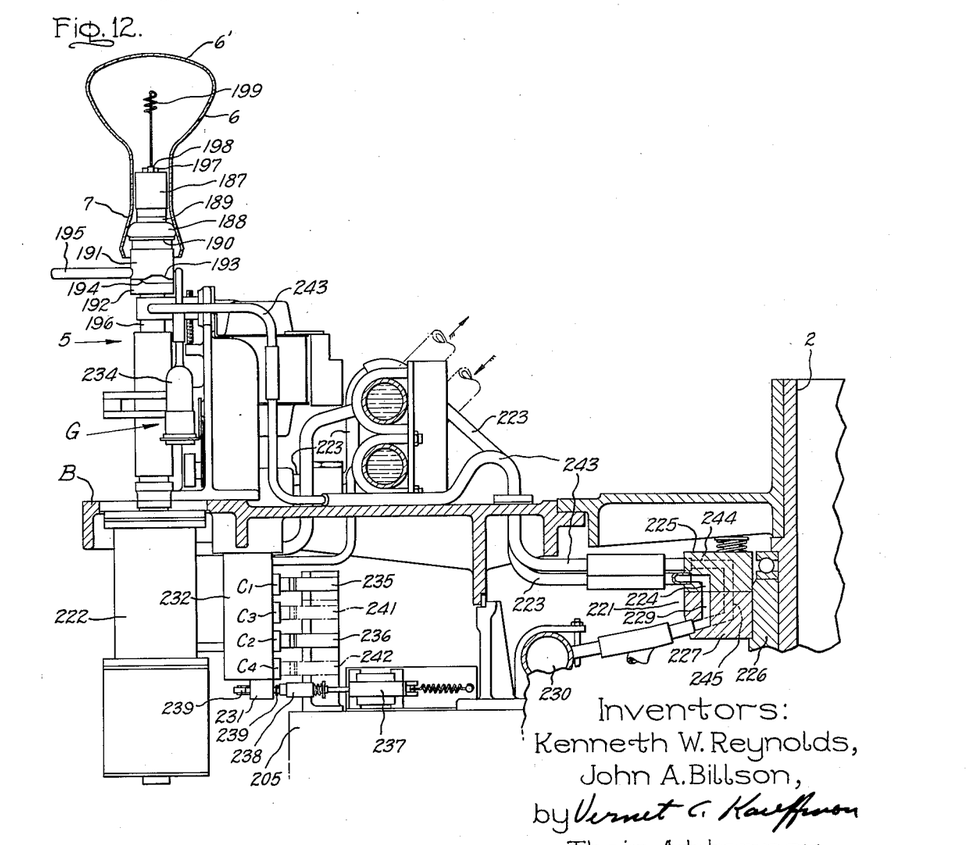
Fig. 12 is a vertical section through one of the heads on the reflector-applying turret and showing the means at the initial high-exhaust station for controlling the supply of electric current to the vaporizer element in the head.

Referring to Figs. 11 and 12, the heads 5 on turret B, to which the washed bulbs 6 are transferred at station B2, each comprise an upright bulb holder 187 over which the neck 7 of the bulb fits. The bulb holder 187 comprises a compression rubber chuck consisting of an expansible rubber ring 188 which is compressed between upper and lower clamp rings or washers 189 and 190, respectively, to thereby expand it against the inside wall of the bulb neck so as to form a vacuum-tight seal therewith and thus close off the interior of the bulb from the atmosphere. The lower clamp ring 190 is raised relative to the upper clamp ring 189, to thereby compress the rubber ring 188, by means of upper and lower cam rings 191 and 192, respectively, having abutting faces 193 and 194 formed with inclined cam surfaces which act to raise the upper cam ring 191 upon rotation thereof relative to the lower cam ring 192. The upper cam ring 191 is provided with an operating lever 195 which projects laterally outward therefrom and is engaged by suitable operating means, at stations B3 and B15, to compress the rubber ring 188 at station B3 and release it at station B15. The compression rubber ring 188, clamp rings 189, 190 and cam rings 191, 192 are all mounted on a tube 196 which extends through the said rings and provides an exhaust passageway extending through the bulb holder 187 and leading to the upper end thereof and into the bulb 6 when mounted thereon. The lower cam ring 192 and the upper clamp ring 189 are fixedly fastened in place on the said tube 196.

At its upper end the bulb holder 187 is provided with a pair of sleeve-type electric socket contacts 197 and 198 for receiving the two ends of an electric vaporizer element 199. The vaporizer element 199 is preferably of the type disclosed and claimed in co-pending U. S. application Serial No. 111,004, Karash et al., filed August 18, 1949, and assigned to the assignee of the present invention, and comprising a coiled filament of suitable refractory metal, such as molybdenum, plated with the reflecting material, such as silver, copper or aluminum, which is to be applied to the inside wall of the bulb 6.

Figures 10, 13:
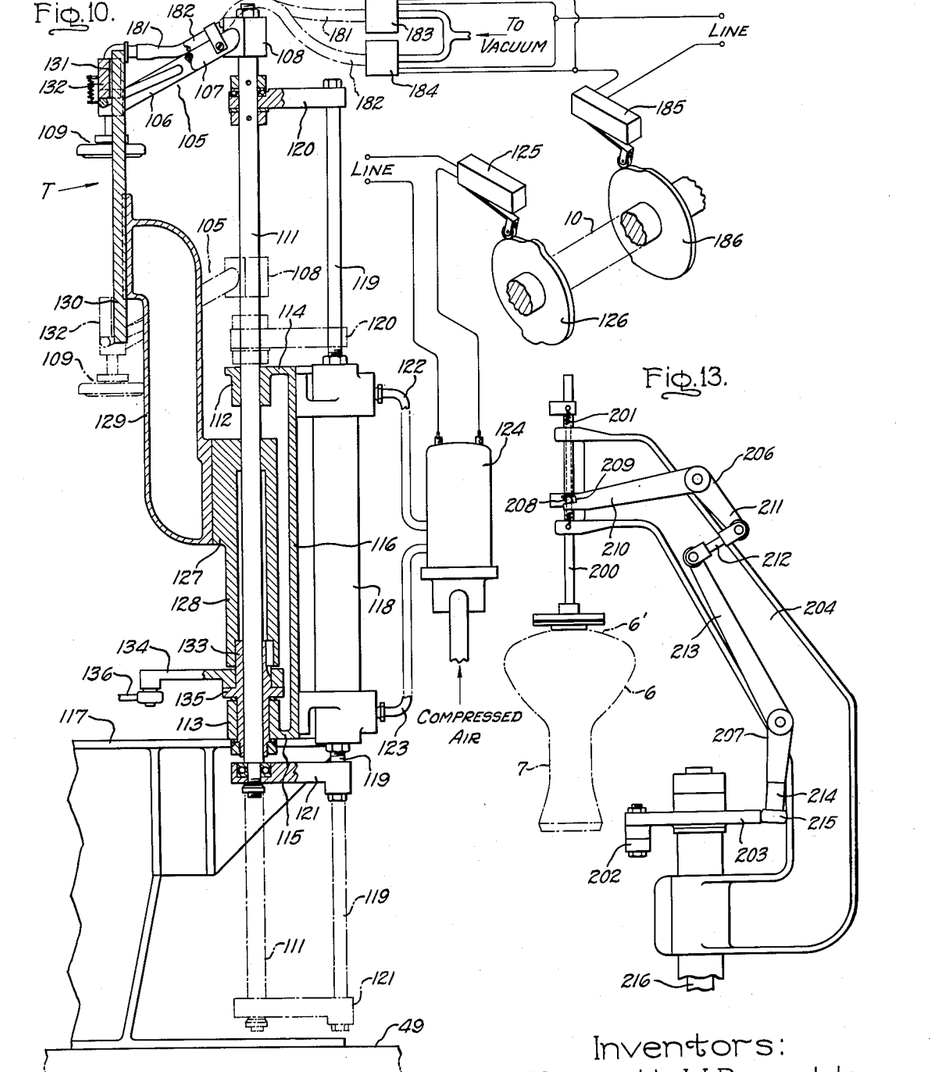
Fig. 10 is a fragmentary vertical elevation of the bulb-transfer mechanism and showing the actuating and control means for vertically reciprocating and supplying vacuum to the bulb pickup holders thereof.
Fig. 13 is a fragmentary elevation of the mechanism for clamping the bulbs in the heads on the reflector-applying turret.

In the operation of the machine, individual vaporizer elements 199 are inserted into the socket contacts 197, 198 of successive heads 5 by an operator at the loading station B1 of the turret B, whereupon the turret successively indexes each head 5 to station B2 where a washed and preheated bulb 6 from the turret A is transferred to and positioned in place on the bulb holder 187 of the head 5 by the transfer mechanism T. Upon subsequent index of the head 5 to the next station B3, the bulb 6 is positively seated and clamped in place on the head 5 by the combined effect of a suction force created in the head by connecting it to a source of vacuum and acting in conjunction with clamping mechanism comprising a vertically reciprocable bulb hold-down rod 200 (Fig. 13) which is moved down and yieldingly pressed against the upper end or top 6' of the bulb by a tension coil spring 201, and a compression chuck operating means comprising a roller 202 which is mounted on a cam plate 203 and is moved against the projecting operating lever 195 of the compression chuck, while the bulb is held down by the hold-down rod 200, so as to rotate the upper cam ring 191 and cause it to compress and expand the rubber ring 188 of the compression rubber chuck against the inside wall of the bulb neck 7, thus clamping the bulb vacuum-tightly in place in the bulb holder 187. As shown in Fig. 13, the hold-down rod 200 is vertically reciprocable in the upper end of an upstanding bracket arm 204 fastened to the pedestal or supporting frame 205 (Fig. 12) for the vaporizing turret B and overhanging the heads 5 when located at the bulb clamping station B3. The vertical reciprocating movements of the bulb hold-down rod 200 are controlled by the cam 203 acting through a pair of interconnected levers 206 and 207 pivoted on the bracket arm 204 and operated by the cam 203 in timed relation to the dwell of the turret B. The lever 206 is connected at one end to the operating rod 200 by a pin and slot connection, the rod being provided with a pin 208 which is vertically movable in a slot in the rod and is arranged to ride in a slot 209 provided in the end 210 of the lever 206. When the pin 208 is moved downwardly by the lever 206 through the vertical slot in the hold-down rod 200, the spring 201 acts to pull the rod down into yielding engagement with the top of the bulb 6, and when the pin 208 is moved upwardly by the lever 206 it engages the upper end of the slot in the rod 200 so as to lift the latter. The other end 211 of the lever 206 is connected by link 212 to one end 213 of the cam follower lever 207, and the latter carries at its other end 214 a cam follower roller 215 which is constantly urged against the periphery of the operating cam 203 by the tension of the spring 201. The cam 203 is mounted at the upper end of a vertically extending cam shaft 216 which is rotatably supported on the machine frame and, as shown in Fig. 1, is driven through intermeshing gears 217 and 218, cross shaft 219, and a chain drive 220, from the main cam shaft 11 for the vaporizing turret B.

As mentioned previously, the heads 5 of turret B are connected, at station B3, to a "rough" vacuum in order to create a suction force at the upper end of the bulb holder 187 which, in addition to partially evacuating the bulb 6, also serves to pull the bulb down against the compression rubber 188 and thus assist in the positive seating of the bulb in a vacuum-tight manner on the compression rubber ring 188. The "rough" vacuum is supplied to the heads 5 at station B3 by means of a conventional Kinney-type vacuum pump (not shown) which is connected through a rotary valve 221 (Fig. 12), a mercury condensation vacuum pump 222, and the passageway in the bulb holder tube 196 to the interior of the bulb 6. The intake passageway of the mercury condensation pump 222 is connected to the tube 196 of the bulb holder 187 and its outlet passageway is connected by conduit 223 to a port 224 in the rotating section 225 of the rotary valve 221 which is mounted on the stationary center support column 226 for the turret B. The stationary section 227 of the rotary valve 221 is provided with a port 228 (Fig. 1) which is connected to the Kinney vacuum pump and which aligns with the port 224 of rotary section 225 when the head 5 is positioned at station B3. A separate mercury condensation pump 222 is provided for each of the heads 5 and is mounted on the underside of the turret B directly beneath the bulb holder 187.

After being properly seated in vacuum-tight manner on the bulb holder 187 and partially evacuated at station B3, the bulb 6 is indexed to the next station B4 where it is further evacuated by being connected, through the mercury pump 222, conduit 223, and through another port 228 in the rotary valve 221, to the same "rough" vacuum pump to which the head 5 is connected at station B3. At the next station B5 the bulb 6 is further evacuated to a higher degree, i. e., down to a pressure of 5 mm. or thereabouts, through the mercury pump 222 which is connected, at all the stations from B5 to B13, to a source of 'fine' or high degree vacuum by the conduit 223 and rotary valve port 224 which, at each of the said stations, aligns with ports 229 in the stationary member 227 of the rotary valve, the individual ports 229 all being connected to a common manifold 230 which is connected to a suitable source of "fine" or high degree vacuum.

If the bulb 6, while at station B5, attains the required degree of vacuum necessary for satisfactory operation of the reflector vaporizing process, the electrical circuit of the vaporizer element 199 in the head 5 is then placed in condition, or preset, for subsequent closure at each of the next eight succeeding stations B5 to B13, inclusive, by the closure of a switch 231 (Fig. 12) which is connected in the vaporizer element circuit and is mounted on an insulative block 232 fastened to the underside of the turret B and carrying four vertically spaced electrical contacts or tracks C1, C2, C3 and C4. Contacts C1 and C2 are connected to the operating circuit for the working tube element 233 and reference tube element 234 of a Pirani type vacuum gauge device G with which each head 5 is provided, while contacts C3 and C4 are connected to the socket contacts 197 and 198 for the vaporizer element 199. The Pirani vacuum gauge device G is arranged to operate a relay (not shown) when the vacuum in the bulb 6 has attained the predetermined required degree for proper operation of the reflector vaporizing process, the relay being mounted on a stationary part of the machine frame and being electrically connected to the vacuum gauge device G through the engagement of the contacts C1 and C2 of the head 5, while positioned at station B5, with stationary contacts 235 and 236 connected to the relay and supported on the table portion 205 of the machine frame. Actuation of the relay by the vacuum gauge device G then operates to energize a solenoid 237 by closing the electrical circuit thereof, the plunger 238 of the solenoid, which is mounted on the machine frame 205, then striking the inner end of the control pin 239 of the switch 231 to thereby close the latter as well as the electrical circuit which is connected across the contacts C3, C4 and which includes the vaporizer element 199. Once the vaporizer element control switch 231 is closed by the solenoid 237 at station B5, it thereafter remains closed at all the subsequent stations and up until the switch is indexed once more between stations B4 and B5 during which index movement the switch is opened by the engagement of the outer end of the switch control pin 239 with a stationary cam 240 (Fig. 1) located between stations B4 and B5.

Upon index of the head 5 to the next station B6, the terminal contacts C3 and C4 for the vaporizer element 199 engage stationary contacts 241 and 242 which are supported on the table portion 205 of the machine frame and are connected to a suitable electric power supply. Electrical energy is thereby supplied to the vaporizer element terminal contacts C3 and C4. Consequently, if the control switch 231 in the vaporizer element circuit has been previously closed at station B5 by the operation of the solenoid 237, as determined by the vacuum gauge device G and its associated relay mechanism, the vaporizer element 199 is then energized and heated, causing the reflector coating material plated thereon to be flashed off the vaporizer element and to condense or deposit on the interior wall of the bulb to form a reflecting coating thereon. The vaporizer element 199 is further energized at each of the succeeding seven stations B7 to B13, to complete the flashing operation and deposition of the reflector coating on the bulb wall, by the engagement at said stations of the contacts C3 and C4 with other stationary contacts corresponding to the contacts 241 and 242 at station B6 and connected to sources of electric power, the voltage applied to the vaporizer element being progressively increased at successive stations. Should the switch 231 not be closed at station B5 by the solenoid 237, by reason of the bulb being insufficiently evacuated at said station with consequent failure of the vacuum gauge device G to trip the solenoid-actuating relay, the circuit to the vaporizer element 199 will thereafter remain open throughout the entire remainder of the index movement of the head 5 around the machine, in which case the uncoated bulb may either be removed from the head and be returned to the prewash turret A or may be allowed to proceed around the vaporizing turret B once again, providing another bulb is not in a position in one of the heads 4 of turret A such that it would be transferred to the particular head 5 of turret B in which the uncoated bulb is left for reprocessing.

Following the completion of the vaporizer flashing operation at station B13, the bulb 6 is disconnected from the exhaust line and flushed with a suitable inert gas (such as a mixture of hydrogen and nitrogen commonly known as forming gas) during the subsequent index movement of the bulb between stations B13 and B14. The inert gas is introduced into the bulb through a conduit 243 which is connected at one end with the interior of the bulb holder tube 196 and at its other end with a port 244 in the rotating section 225 of the rotary valve 221, the port 244 passing over and momentarily communicating, during the index of the head 5, with a corresponding port 245 (Fig. 1) which is located in the stationary section 227 of the rotary valve and is connected to a supply of the inert gas. The introduction of the inert gas into the bulb 6 serves to cool the hot vaporizer element 199 without oxidizing it so that it will be at a sufficiently low temperature as not to oxidize when the bulb is subsequently opened to the atmosphere at the bulb unclamping station B15.

After passing through idle station B14 where the bulb 6 and the vaporizer element 199 are permitted to cool still further, the head 5 is indexed to the bulb unclamping station B15 where the compression rubber chuck is opened, to release the bulb 6 therefrom for removal from the head 5, by the engagement of a swing lever 246 (Fig. 1) with the operating lever 195 of the compression rubber chuck. The lever 246 is mounted on a vertical shaft 247 and it is swung or oscillated, in timed relation to the dwell of each head 5 at station B15, by a sector gear 248 which is meshed with a pinion gear 249 on the shaft 247, the sector gear 248 being oscillated in turn by a cam 250 on shaft 219 and an interconnecting cam follower link 251. Along with the unclamping of the bulb 6 from the compression rubber chuck at station B15, the bulb is also again flushed with inert gas for the purpose of "breaking" the vacuum-tight seal between the bulb and the compression rubber ring 188 and separating the bulb from the latter. The inert gas is supplied to the bulb at station B15 through the conduit 243 and the rotary valve port 244 which aligns with a port 252 (Fig. 1) in the stationary section 227 of the rotary valve, the said port 252 being connected to the same supply of inert gas to which the port 245 is connected.

The coated bulb 6 and the flashed vaporizer element 199 are subsequently removed from the head 5 by an operator at the unloading station B16, whereupon the head 5 is then reloaded with an unflashed vaporizer element 199 in readiness for the next cycle of movement of the head 5 around the machine.

In the operation of the apparatus comprising the invention, the upright neck-down positioned glass bulbs 6 in the bulb supply track 35 are successively picked up by the suction cup 109 of the transfer mechanism T and transferred, one by one, into the empty heads 4 of the bulb prewash turret A during the interval when each head 4 is positioned at station A1. The index movement of turret A then carries the bulbs 6 successively through and positions them at the series of work stations A2 to A16 at the first one of which (i. e., work station A2) the spray nozzle 36 directs a stream of cleaning solution, preferably de-ionized water at 135° F. or so, upwardly into the bulb. At the next three stations A3, A4 and A5 the respective air nozzles 37, 38 and 39 located at such stations are moved upwardly into the bulb by the elevating mechanism 40 and direct high pressure air jets into the bulb to forcibly expel the excess wash water remaining on the bulb wall. After passing through two idle stations A6 and A7 at which natural drainage of any further remaining wash water on the bulb wall may occur, the bulb is then externally heated at the next two stations A8 and A9, by the radiant gas burners 87, to vaporize any moisture still remaining in the bulb. At the succeeding four stations A10 to A13, the air nozzles 88 at such stations are moved upwardly into the bulb, by elevating mechanism similar to the mechanism 40 for the nozzles 36 to 39, and direct low pressure heated air jets into the bulb while at the same time the external heating of the bulb by the radiant gas burners 87 is continued, the heated air jets serving to force out of the bulb the vaporized moisture present therein. Following the last hot air blow-out station A13, the bulb is conveyed by the turret A through a continuous oven 100 which spans the final three stations A14 to A16 and heats the bulb to a temperature of around 300° C. or slightly less, to prepare it for the subsequent evacuation and reflector coating operations which are performed on the bulb on the second turret B.

From the final preheating station A16 the bulb is indexed to the first station A1 once again where the suction cup 110 of the transfer mechanism T then picks it up and transfers it to that one of the heads 5 of the reflector coating turret B which is positioned at station B2 and which has been previously loaded at station B1 with a vaporizing element 199, the other suction cup 109 of the transfer mechanism T at the same time picking up the foremost one of the line of bulbs in the supply track 35 and transferring it into the emptied head 4 of turret A at station A1. After its transfer to the head 5 on turret B, the preheated bulb is then connected at station B3 in a vacuum-tight manner to the exhaust line 223 of the head by the compression and expansion of the rubber ring 188 against the inside wall of the bulb through the engagement of the cam roller 202 with the operating lever 195 of the compression rubber chuck, the bulb meanwhile being held down against the rubber ring 188 during this operation by the hold-down rod 202. The bulb is then exhausted to a preliminary "rough" vacuum at station B3 and the next station B4, after which it is exhausted to and continuously maintained at a high degree or "fine" vacuum at each of the ensuing stations B5 through B13 and during its travel therebetween. At station B6, as well as at each of the succeeding exhaust stations B7 through B13, the vaporizer element 199 is energized and heated to cause the coating material plated thereon to vaporize or flash off the vaporizer element and condense or deposit on the interior wall of the bulb to form a reflector coating thereon. The coated bulb is then flushed with an inert cooling gas during its index movement between stations B14 and B15 after which it is disengaged from the compression rubber chuck at station B15, by the engagement of lever 246 with the operating lever 195 of the chuck, while the bulb is again flushed with inert cooling gas at the said station. The coated bulb and the flashed vaporizer element 199 are subsequently removed by an operator from the head 5 at station B16 and the said head then reloaded with a plated vaporizer element in readiness for the next cycle of movement of the head around the machine.

From the above description it will be evident that we have provided a machine which combines the operations of cleaning the bulb and applying a reflector coating thereto so that these operations are greatly simplified and concentrated at one location in the factory, and the amount of handling of the bulb reduced to a considerable degree, thereby resulting in a much more efficient and simplified manufacturing procedure. Moreover, since with the machine according to the invention the reflective coating is applied to the bulb as soon as it is cleaned, there is little or no chance of the cleaned interior of the bulb becoming contaminated with foreign matter, prior to the application of the reflective coating thereto, such as would prevent the formation of poorly adherent and therefore low quality coatings. As a result, the machine of our invention assures the efficient production of uniform, high-quality, internal reflective coatings on the bulbs. Also, the heating of the bulbs on the prewash turret to an elevated temperature, preferably over about 100° C. but below the softening point of the bulb glass, serves to drive out all the moisture on the internal surface of the bulb and to materially reduce the amount of air in the bulb, thereby appreciably shortening the time required for the subsequent evacuation of the bulb on the reflector coating turrret.

Although a preferred embodiment of our invention has been disclosed, it will be understood that the invention is not to be limited to the specific construction and arrangement of parts shown, but that they may be widely modified within the spirit and scope of our invention as defined by the appended claims.

What we claim as new and desire to secure by Letters Patent of the United States is:

1. In combination with coating apparatus comprising a carrier provided with a plurality of heads for supporting and evacuating a glass lamp bulb and depositing a reflective coating onto the interior wall thereof by thermal vaporization, a bulb washing carrier adjacent the bulb coating carrier and having a plurality of heads each provided with a bulb holder for supporting the bulb in an upright position with its open neck end down, means for advancing said carriers in synchronized relation to each other to advance the heads on the bulb washing carrier through a plurality of work stations, means for advancing said carrier to move the heads through a series of work stations, means comprising a nozzle located at one of said stations and directed upwardly in alignment with the open neck end of a bulb at said station for injecting a stream of cleaning liquid into said bulb, means along the path of travel of said heads from the wash station to expel the remaining cleaning liquid from and thoroughly dry the interior surface of said bulb, heating means along the path of travel of said heads from said drying means for externally heating the bulb to a temperature of the order of several hundred degrees centigrade but below the softening point of the bulb glass, and bulb-transfer means located adjacent the path of travel of the said heads from said heating means for automatically transferring the heated bulbs in said heads into the heads on said bulb coating carrier.

2. Apparatus for cleaning the interior wall of a glass bulb in preparation for applying a coating of a reflecting medium thereto, comprising a movable carrier having a plurality of heads each provided with a bulb holder for supporting the bulb in an upright neck-down position and gripping it to restrain upward movement thereof out of the holder, means for advancing said carrier to move the heads through a series of work stations, washing means for directing a stream of cleaning liquid solely into and against the interior surfaces of the bulbs in said heads, said washing means comprising a vertically reciprocable nozzle located at one of said stations at a level normally below and directed upwardly in alignment with the open neck end of a bulb at said station, elevating means operatively connected to said nozzle and actuated by the carrier advancing means in timed relation to the dwell of each head at said one work station to elevate the said nozzle into the bulb at said one station, heating means along the path of travel of said heads from the wash station for externally heating the bulb to a temperature sufficient to vaporize the remaining cleaning liquid adhering to the interior wall of the bulb, an upwardly directed air nozzle located along the path of travel of said heads from said heating means to direct a jet of heated air into the bulb to drive out the vaporized liquid therein, and heating means along the path of travel of the heads from said heated air injection nozzle for externally heating the bulb to a temperature of the order of several hundred degrees centigrade but below the softening point of the bulb glass.

3. Apparatus for cleaning the interior wall of a glass bulb in preparation for applying a coating of a reflecting medium thereto, comprising a movable carrier having a plurality of heads each provided with a bulb holder for supporting the bulb in an upright neck-down position and gripping it to restrain upward movement thereof out of the holder, means for advancing said carrier to move the heads through a series of work stations, washing means for directing a stream of cleaning liquid solely into and against the interior surfaces of the bulbs in said heads, said washing means comprising a vertically reciprocable nozzle located at one of said stations at a level normally below and directed upwardly in alignment with the open neck end of a bulb at said station, elevating means operatively connected to said nozzle and actuated by the carrier advancing means in timed relation to the dwell of each head at said one work station to elevate the said nozzle into the bulb at said one station, means engageable with and actuated by a bulb in a head at said one station to supply cleaning liquid under pressure to said nozzle only when a bulb is present in the head at said station, an air nozzle located at another of said work stations for directing a high pressure jet of air into the bulb to expel the excess cleaning liquid adhering to the interior wall of the bulb, heating means along the path of travel of said heads from said air nozzle for externally heating the bulb to a temperature sufficient to vaporize the remaining cleaning liquid adhering to the interior wall of the bulb, an upwardly directed air nozzle located along the path of travel of said heads from said heating means to direct a jet of heated air into the bulb to drive out the vaporized liquid therein, and heating means along the path of travel of the heads from said heated air injection nozzle for externally heating the bulb to a temperature of the order of several hundred degrees centigrade but below the softening point of the bulb glass.

4. In combination with coating apparatus comprising an indexing turret provided with a plurality of heads for supporting and evacuating a glass lamp bulb and depositing a reflective coating onto the interior wall thereof by thermal vaporization, a bulb washing turret adjacent the bulb coating turret and having a plurality of heads each provided with a bulb holder for supporting a bulb in an upright position with its open neck end down, means for indexing said turrets in synchronized relation to each other to advance the heads on the bulb washing turret through a plurality of work stations, a washing nozzle located at one of said stations and directed upwardly in alignment with the open neck end of a bulb at said one station to inject a stream of purified hot water into said bulb and against the interior surface thereof, means at succeeding stations to expel the remaining water from and thoroughly dry the interior surface of said bulb, heating means at subsequent stations for intensively heating the bulb to an elevated temperature of the order of several hundred degrees centigrade but below the softening point of the bulb glass, and a bulb transfer device located adjacent the path of travel of the said heads from said heating means and operating in timed relation to the dwell of said turrets to automatically transfer the heated bulbs from the heads of the bulb washing turret to the heads of the bulb coating turret.

5. In combination, a pair of side-by-side turrets each provided with a plurality of heads for supporting an article, supply means located adjacent one of said turrets and carrying a supply of articles to be processed, means for indexing said turrets in synchronized relation with each other to advance the respective heads thereon through a plurality of work stations, an article loading and transfer device located adjacent the path of travel of the heads in said turrets and comprising a transfer member having means to grip and transfer an article in a head on one of said turrets to a head on the other of said turrets and to simultaneously grip and transfer an article on said supply means to the emptied head of the said one turret, and means for operating said loading and transfer device in timed relation to the dwell of said turrets.

6. In combination with coating apparatus comprising an indexing turret provided with a plurality of heads for supporting and evacuating a glass lamp bulb and depositing a reflective coating onto the interior wall thereof by thermal vaporization, a bulb washing turret adjacent the bulb coating turret and having a plurality of heads each provided wtih a bulb holder for supporting a bulb in an upright position with its open neck end down, means for indexing said turrets in synchronizing relation to each other to advance the heads on the bulb washing turret through a plurality of work stations, a washing nozzle located at one of said stations and directed upwardly in alignment with the open neck end of a bulb at said one station to inject a stream of purified hot water into said bulb, means at succeeding stations to expel the remaining water from and thoroughly dry the interior surface of said bulb, heating means at subsequent stations for intensively heating the bulb to a temperature of the order of several hundred degrees centigrade but below the softening point of the bulb glass, and a bulb loading and transfer device located adjacent the path of travel of the said heads from said heating means and operating in timed relation to the dwell of said turrets to automatically transfer the heated bulb from the heads of the bulb washing turret to the heads of the bulb coating turret and simultaneously load unprocessed bulbs into the emptied heads of the bulb washing turret.

7. In combination, a pair of side-by-side turrets each provided with a plurality of heads for supporting an article, supply means located adjacent one of said turrets and carrying a supply of articles to be processed, means for indexing said turrets in synchronized relation with each other to advance the respective heads thereon through a plurality of work stations, an article loading and transfer device located adjacent the path of travel of the heads in said turrets and comprising a transfer member including a first and second gripper means arranged to be in alignment with and above a head on one of said turrets and an article in said supply means respectively, and means mounting said gripper means for conjoint vertical reciprocation and for swinging movement in a horizontal plane about a common vertical axis, said axis being at the center of an arc intersecting the respective vertical axes through the said head on said one turret, through a head on the other turret and through the article in said supply means, means for effecting operation of said transfer member in a sequence of steps to move said gripper means downward to grip respective articles in the head of said one turret and in said supply means, thence upward to carry the articles therewith, thence in a swinging movement about said common axis to align the first gripper means with the said head in the other said turret and to align the second gripper means with the said head of said one turret, thence downward to deliver the articles into the said heads of the respective turrets, and means for operating said loading and transfer device in timed relation to the dwell of said turrets.

References Cited in the file of this patent

UNITED STATES PATENTS

| | | |
|---|---|---|
| 10,976 | Miller | May 30, 1854 |
| 1,296,079 | Hitchcock et al. | Mar. 4, 1919 |
| 1,532,255 | Miller | Apr. 7, 1925 |
| 1,642,419 | Loew | Sept. 13, 1927 |
| 2,023,496 | Todd | Dec. 10, 1935 |
| 2,106,706 | Gordon | Feb. 1, 1938 |
| 2,301,892 | Lewis | Nov. 10, 1942 |
| 2,380,306 | Hallowell, Jr. | July 10, 1945 |
| 2,442,350 | Felber | June 1, 1948 |
| 2,536,695 | Ratner | Jan. 2, 1951 |
| 2,633,437 | Detjen | Mar. 31, 1953 |